United States Patent [19]

Short

[11] 3,995,095

[45] Nov. 30, 1976

[54] MODIFICATION OF POLYMERS BY TREATMENT WITH OLEFINS

[75] Inventor: James N. Short, Bartlesville, Okla.

[73] Assignee: Phillips Petroleum Company, Bartlesville, Okla.

[22] Filed: Apr. 18, 1975

[21] Appl. No.: 569,520

Related U.S. Application Data

[60] Division of Ser. No. 380,015, July 17, 1973, Pat. No. 3,912,703, which is a continuation of Ser. No. 72,242, Sept. 14, 1970, abandoned.

[52] U.S. Cl. .................................................. 526/48
[51] Int. Cl.$^2$ ......................... C08C 4/00; C08C 2/00
[58] Field of Search ................. 260/94.7 N, 94.7 R, 260/85.1, 85.3, 93.1; 450/619

[56] References Cited

UNITED STATES PATENTS

| | | | |
|---|---|---|---|
| 3,437,649 | 4/1969 | Mueller | 260/94.7 |
| 3,494,983 | 2/1970 | Diem | 260/878 |
| 3,558,518 | 1/1971 | Zuech | 252/429 |
| 3,721,718 | 3/1973 | Hughes et al. | 260/94.9 B |

*Primary Examiner*—Joseph L. Schofer
*Assistant Examiner*—Maria S. Tungel

[57] ABSTRACT

Polymers containing internal unsaturation are modified by treatment with a lower molecular weight olefin in the presence of an olefin disproportionation catalyst.

32 Claims, No Drawings

MODIFICATION OF POLYMERS BY TREATMENT WITH OLEFINS

This is a divisional application of Ser. No. 380,015, filed July 17, 1973, now U.S. Pat. No. 3,912,703, issued Oct. 14, 1975, which was a continuation of Ser. No. 72,242, filed Sept. 14, 1970, now abandoned.

FIELD OF THE INVENTION

This invention relates to the modification of unsaturated polymers by treatment with olefins. In another aspect, it relates to the modification of the molecular weight of polymers having internal unsaturation in the polymer backbone.

DESCRIPTION OF THE PRIOR ART

It has been reported in the prior art that olefins containing from 2–20 carbon atoms per molecule could be contacted with certain catalysts (called disproportionation or olefin reaction catalysts) to provide olefin products having both a higher and lower molecular weight than the feed olefin. It is oftentimes desirable to reduce the molecular weight of high molecular weight rubbers or resinous diene polymers in order to render them processable for various conventional applications. At other times, it is desirable to increase the molecular weight of these polymers. The art has also desired a method of producing relatively low molecular weight nonconjugated polymers in order to utilize these low molecular weight polymers as plasticizers or adhesives. Additionally, the art has found it sometimes desirable to reduce the molecular weight of a polymer while at the same time altering the structure of the polymer.

OBJECTS OF THE INVENTION

Accordingly, it is an object of this invention to provide a method of decreasing the molecular weight of polymers having internal unsaturation in the polymer backbone. It is a futher object of this invention to increase the molecular weight of internally unsaturated polymers. It is a further object of this invention to provide a method of preparing nonconjugated polymers of low molecular weight. It is a further object of this invention to provide a method of altering the structure of a diene polymer while at the same time reducing the molecular weight thereof. Other objects and advantages of the invention will be apparent to one skilled in the art from a study of the disclosure and claims.

SUMMARY OF THE INVENTION

I have discovered that high molecular weight polymers having internal unsaturation in the polymer backbone when contacted with an olefin of low molecular weight in the presence of an olefin disproportionation catalyst undergo a significant change in the molecular weight of the polymer. The catalyst for this reaction is any catalyst capable of disproportionating acyclic olefins in accordance with the herein defined olefin reaction.

The olefin disproportionation catalysts employed in the invention include heterogeneous catalysts which are capable of olefin disproportionation activity in the presence or absence of an inert liquid hydrocarbon diluent and homogeneous catalysts which are generally employed in the presence of a liquid phase during the reaction. The homogeneous catalysts are generally a transition metal compound and a selected reducing agent.

In accordance with the invention, the molecular weight of the polymers is reduced by contacting the polymer with a heterogeneous olefin disproportionation catalyst or a selected homogeneous disproportionation catalyst in the presence of a lower molecular weight olefin.

Further in accordance with the invention, the molecular weight of the polymers is increased by contacting the polymer with a selected homogeneous olefin disproportionation catalyst in the presence of a lower molecular weight olefin wherein the transition metal compound is a coordinate compound containing a nitrous oxide ligand, and the molar ratios of the coordinate transition metal compound to the reducing agent are at a hereinafter specified level.

Further, when unsaturated polymers of high molecular weight are reacted for a sufficient length of time, nonconjugated polymers of low molecular weight are produced.

DETAILED DESCRIPTION OF THE INVENTION

The initial molecular weight of the polymer treated in accordance with the invention is in the range of from about 1,000 to about 10,000,000. Preferably, the molecular weight is in the range of from about 10,000 to 500,000. The term "molecular weight" as used throughout this specification and the claims refers to weight-average molecular weight. For the purpose of clarity in defining the invention and as applied to the claims, the weight-average molecular weight is determined by light scattering, as reported in "Encyclopedia of Polymer Science and Technology", Vol. 8, pp. 231–233, John Wiley & Sons, Inc. (1968). As a practical matter, any method presently known in the art or hereinafter developed can be used to determine molecular weight and to observe the resulting modification of the molecular weight as a result of treatment in accordance with the invention. For example, it is convenient to determine the inherent viscosity of the polymer before and after treatment to observe the relative molecular weight change.

Any polymer which is capable of modification in molecular weight when treated in accordance with the invention can be employed. It is believed that the polymer must have sufficient internal unsaturation to undergo modification of the molecular weight. In theory, an average of at least one double bond in the carbon backbone per polymer molecule is necessary. As a practical matter those polymers containing an average of from about 0.25 to 1 internal double bond per monomer unit are preferred. The terms "internal double bond" and "double bond in the carbon backbone" excludes vinyl unsaturation. However, of course, it is understood that the polymer treated in accordance with the invention can also have vinyl unsaturation. These internally unsaturated polymers employed in the invention can be defined using more descriptive terms, i.e., liquid, elastomeric and resinous polymers. The elastomeric and resinous polymers are the more preferred.

The polymer unsaturation can be determined by two separate techniques, iodine monochloride titration and infrared analyses. Where appropriate, a combination of these techniques can be used. ICl titration is an art recognized general method for determining the level of carbon-carbon unsaturation in a wide variety of polymers. Results are expressed in terms of mmoles of ICl reacted with one gram of polymer. Thus, when one prepares a polymer containing from 0.25–1 double bonds per monomer unit, one can calculate the average number of carbon-carbon double bonds per molecule if the average molecular weight is known. For the purpose of determining the extent of unsaturation in the polymer, the weight-average molecular weight value employed is the one as determined by the above-described light scattering technique. The ICl titration procedure measures total unsaturation, e.g., it does not distinguish between "internal" and "vinyl" unsaturation. However, even when the polymer has less than 0.25–1 double bonds per monomer unit, if the polymer undergoes modification of the molecular weight when treated according to the process of the invention, then inherently the polymer contains sufficient internal unsaturation.

The second method which can be employed to determine unsaturation is the art recognized procedure of infrared analyses. This method has particular utility for the preferred class of polymers treated according to the invention, i.e., homopolymers and copolymers of conjugated dienes. Infrared analysis is useful for determining the amount of 1,4-addition (internal unsaturation) in these polymers. Other known methods are also available for determining vinyl unsaturation.

The preferred polymers which can be treated according to the process of the invention are homopolymers of conjugated dienes containing 4–12 carbon atoms per molecule, copolymers of two or more dienes containing from 4–12 carbon atoms per molecule, and copolymers of dienes with vinyl monomers wherein the diene contains 4–12 carbon atoms per molecule. Unsaturated polymers of cyclic monoolefins such as cyclopentene are equally preferred. The copolymers of the conjugated dienes with the vinyl monomers contain at least 5 parts by weight of the diene per 100 parts by weight of the copolymer. Mixtures of diene homopolymers, mixtures of copolymers, or mixtures of homopolymers and copolymers can be employed in the process of the invention. In either case, the mixtures of diene homopolymers, the mixtures of diene copolymers, or the mixtures of diene homopolymers and diene copolymers advantageously have a molecular weight of at least about 1000.

Homopolymers of conjugated dienes containing from 4–12 carbon atoms per molecule can be prepared by any means known in the art. A suitable method for the preparation of the homopolymers is disclosed in U.S. Pat. No. 3,278,508, issued Oct. 11, 1966. Exemplary homopolymers which can be employed in the process of the invention are homopolymers of 1,3-butadiene
isoprene,
2,3-dimethyl-1,3-butadiene
1,3-pentadiene (piperylene)
2-methyl-3-ethyl-1,3-butadiene
3-methyl-1,3-pentadiene
2-methyl-3-ethyl-1,3-pentadiene
2-ethyl-1,3-pentadiene
1,3-hexadiene
3-methyl-1,3-heptadiene
1,3-octadiene
3-butyl-1,3-octadiene
3,4-dimethyl-1,3-hexadiene
3-n-propyl-1,3-pentadiene
4,5-diethyl-1,3-octadiene
2-phenyl-1,3-butadiene
2,3-diethyl-1,3-butadiene
2,3-di-n-propyl-1,3-butadiene
2-methyl-3-isopropyl-1,3-butadiene
and the like.

Conjugated dienes containing halogen and alkoxy substituents along the chain can also be employed such as chloroprene, fluoroprene, 2-methoxy-1,3-butadiene, 2-ethoxy-3-ethyl-1,3-butadiene, and 2-ethoxy-3-methyl-1,3-hexadiene.

Copolymers of conjugated dienes containing from 4–12 carbon atoms per molecule with vinyl monomers copolymerizable therewith can be prepared by any means known in the art. Exemplary compounds which can be used to form copolymers of conjugated dienes with the vinyl monomers in the invention include aryl-substituted olefins, such as styrene, various alkyl styrenes, para-methoxystyrene, 1-vinylnaphthalene, and the like;

heterocyclic nitrogen-containing monomers, such as pyridine and quinoline derivatives containing at least 1 vinyl or alphamethyl-vinyl group, such as 2-vinylpyridine, 3-vinylpyridine, 4-vinylpyridine, 3-ethyl-5-vinylpyridine, 2-methyl-5-vinylpyridine, 3,5-diethyl-4-vinylpyridine, etc.;

similar mono- and di-substituted alkenyl pyridines and like quinolines;

acrylic acid esters, such as methyl acrylate, ethyl acrylate;

alkacrylic acid esters, such as methyl methacrylate, ethyl methacrylate, propyl methacrylate, ethyl ethacrylate, butyl methacrylate;

methyl vinyl ether, vinyl chloride, vinylidene chloride, vinylfuran, vinylcarbazole, vinylacetylene, etc.

In addition, copolymers can be prepared using minor amounts of copolymerizable monomers containing more than one vinylidene group such as 2,4-divinylpyridine, divinylbenzene, 2,3-divinylpyridine, 3,5-divinylpyridine, 2,4-divinyl-6-methylpyridine, 2,3-divinyl-5-ethylpyridine, and the like.

Lower molecular weight olefins employed as treating agents in the process of the invention are nontertiary, nonconjugated acyclic mono- and polyenes having at least 2 carbon atoms per molecule including cycloalkyl, cycloalkenyl, and aryl derivatives thereof; cyclic mono- and polyenes having at least 4 carbon atoms per molecule including alkyl and aryl derivatives thereof; mixtures of the above olefins; and mixtures of ethylene and the above olefins. Many useful reactions are accomplished with such acyclic olefins having 2–30 carbon atoms per molecule and with such cyclic olefins having 4–30 carbon atoms per molecule. Nontertiary olefins are those olefins having at least one double bond wherein the carbon atoms which are attached to each other by means of the double bond, are also attached to at least one hydrogen atom.

Some specific examples of acyclic olefins suitable for reactions of this invention include ethylene, propylene, 1-butene, 2-butene, 1-pentene, 2-pentene, 1-hexene, 1,4-hexadiene, 2-heptene, 1-octene, 2,5-octadiene, 2-nonene, 1-dodecene, 2-tetradecene, 1-hexadecene, 3-methyl-1-butene, 1-phenyl-2-butene, 4-octene, 3-eicosene, 3-heptene, 3-hexene, 1,4-pentadiene, 1,4,7-dodecatriene, 2-methyl-4-octene, 4-vinylcyclohexene, 1,7-octadiene, 1,5-eicosadiene, 2-triacontene, 2,6-dodecadiene, 1,4,7,10,13-octadecapentaene, 8-cyclopentyl-4,5-dimethyl-1-decene, 6,6-dimethyl-1,4-octadiene, and the like, and mixtures thereof.

Some specific examples of cyclic olefins suitable for the reactions of this invention are cyclobutene, cyclopentene, cycloheptene, cyclooctene, 5-n-propylcyclooctene, cyclodecene, cyclododecene, 3,3,5,5-tetramethylcyclononene, 3,4,5,6,7-pentaethylcyclodecene, 1,5-cyclooctadiene, 1,5,9-cyclododecatriene, 1,4,7,10-cyclododecatetraene, 6-methyl-6-ethylcyclooctadiene-1,4, and the like, and mixtures thereof.

Lower molecular weight materials such as ethylene, propylene, butenes, pentenes, and hexenes are most frequently employed, but the choice of olefin is governed by the type of diene polymer treated and the results desired. Single olefins or mixed olefins can be used in the process. The amount of olefin utilized as a treating agent is governed by the results desired with a particular polymer being treated. It is generally in the range of 5 to 100 parts by weight per 100 parts by weight of the polymer.

The terms "olefin reaction" and "olefin reaction catalysts" refer to a conversion of olefinic materials (and a catalyst which effects such a conversion) to produce other olefinic materials wherein the reaction can be visualized as the breaking of two existing double bonds between first and second carbon atoms, and between third and fourth carbon atoms, respectively, and the formation of two new existing bonds, such as between the first and third and second and fourth carbon atoms, respectively, and wherein the two existing double bonds can be on the same or different molecules. The breaking and formation of these bonds can be visualized by using a mechanistic scheme involving a cyclobutane intermediate. Thus, two unsaturated pairs of carbon atoms combine to form a four center (cyclobutane) intermediate which then disassociates by breaking either set of opposing bonds.

Other terms have been utilized to describe reactions of olefinic materials which are within the scope of the olefin reaction as defined above. These include such terms as "olefin disproportionation", "olefin dismutation", "transalkylidenation", and "olefin metathesis". Throughout the specification and claims, the term olefin disproportionation is used as a matter of choice and is deemed equivalent to the above mentioned terms, including the "olefin reaction" terminology.

Any catalyst having activity for converting olefins in accordance with the above-described olefin disproportionation reaction can be employed to modify the polymers in the presence of the olefin treating agents. These catalyts include both heterogeneous catalysts which are capable of olefin disproportionation activity in the presence or absence of a liquid diluent and homogeneous catalysts which are generally employed in the presence of a liquid diluent. Of course, where the olefin, or monomer, is liquid under normal reaction conditions, it can function as a diluent for the homogeneous catalyst. For the purposes of this invention, the modification of the molecular weight polymers of dienes or polymers of cyclic monoolefins, the homogeneous catalyts are preferred.

The heterogeneous catalysts which are particularly suitable for the modification reaction in the presence of olefin treating agents include tungsten oxide on silica, tungsten oxide on alumina, molybdenum oxide on alumina, rhenium oxide on alumina, molybdenum oxide on aluminum phosphate, molybdenum hexacarbonyl on alumina, and any of the above in admixture with an organometal reducing agent such as methylaluminum sesquichloride. These catalysts are the subject of U.S. Pat. Nos. 3,261,879 (Banks) of July 19, 1966; 3,365,513 (Heckelsberg) of Jan. 23, 1968; British Patent No. 1,054,864 (British Petroleum) of Jan. 11, 1967; U.S Pat. No. 3,463,827 (Banks) of Aug. 26, 1969; U.S. application Ser. No. 846,977, filed Aug. 1, 1969; and U.S. application Ser. No. 816,052, filed Apr. 14, 1969.

The steps of preparation, activation and maintenance of the heterogeneous olefin disproportionation catalysts are known in the art, and with reference to the specific systems discussed above, are disclosed in the above-mentioned patents and applications. The various solid catalysts exhibit different optimum reaction temperatures, pressures, and contact times for the modification reaction. Generally, the preferred temperature, pressure, and time for the modification reaction will be substantially the same as the optimum conditions at which the olefin disproportionation catalyst will convert lower molecular weight acyclic olefins such as propylene, butenes, and pentenes. Where the optimum temperature for the olefin disproportionation reaction is higher than about 250° F, the polymer is preferably treated in a solution of an inert diluent for a short period of time in the liquid phase. This technique is designed to minimize degradation of the polymer due to thermal degradation. Excessively high reaction temperatures at which the polymers tend to decompose are to be avoided.

The homogeneous catalysts which are preferably employed in the invention are generally an admixture of (a) a transition metal compound and (b) an organometallic compound. The (a) components of the homogeneous olefin disproportionation catalysts which are typical of the present invention can be represented by the formula $[(L)_a(L')_b M_c Z_d]_x$ wherein each (L) and (L') are organic or inorganic ligands; M is a transition metal of Group IB, IIIB, IVB, VB, VIB, VIIB, the iron and cobalt subgroups of Group VIII; Z is halide or a radical such as CN, SCN, OCN, and $SnCl_3$; $a$ and $d$ are numbers 0–6, $b$ is 0–2, $c$ is 1–4; $x$ is a number indicative of the polymeric state of the compound, generally 1–3 or higher; at least one of (L), (L') or Z is present; and wherein the number of (L), (L') and Z groups present in the component (a) compound shall not be greater than the number required for the metal to achieve the closed shell electronic configuration of the next higher atomic number inert gas. Preferred (L) ligands are $R_3Q$, $R_3QO$, $R_2Q-QR_2$, $R_2NR^1$, O, S, CO, $R_2N-R^2-NR_2$, R—S—R, $R^3S$, [$\pi$-($CHR^4-CR^4-CH_2$)], $R^5(CN)_k$, $R^5O-$, $R^5(COO-)_k$, $RCOR^6(COO-)_k$, [$(RCO)_2CH-$], ($R_2NCSS-$), unsubstituted and $R^5$ group-substituted pyridine, unsubstituted and $R^5$ group-substituted bipyridine, or unsubstituted and R group-substituted cyclopentadienyl radicals; (L') ligands are NO or [$\pi$-($CHR^4-CR^4-CH_2-$)]; wherein R is an aromatic or saturated aliphatic radical, including radicals substituted with groups such as halo groups or alkoxy groups and the like, having up to 20 carbon atoms; $R^1$ is hydrogen or an R radical; $R^2$ is a divalent R radical; $R^3$ is a divalent saturated aliphatic or ethylenically unsaturated aliphatic radical having from 4 to 10 carbon atoms; $R^4$ is hydrogen or methyl radical; $R^5$ is an aromatic, saturated aliphatic, or ethylenically unsaturated aliphatic radical having up to 30 carbon atoms; $R^6$ is a divalent saturated aliphatic radical having from 1 to 10 carbon atoms; Q is phosphorus, arsenic, or antimony; and $k$ is 1–2.

The preferred component (a) compounds are complex compounds of the metals of Groups VIB, VIIB, and the iron and cobalt subgroups of Group VIII. The more preferred compounds are those of molybdenum, tungsten, rhenium, ruthenium or rhodium. Those (a) components which contain $(L)_a$ and $(Z)$ groups wherein $a$ is 1–5 and/or $Z$ is 1–5 are generally preferred. The most preferred $(L)_a$ group is the $R^5(COO-)_k$ radical. Also preferred are (a) components wherein $(L')_b$ is NO and $b$ is 1–2.

Suitable examples of the preferred $R^5(COO-)M_cZ_d$ compounds include molybdenum trichloride distearate, molybdenum trichloride dioctanoate, molybdenum trichloride dilaurate, molybdenum trichloride dioleate, molybdenum trichloride dibenzoate, molybdenum trichloride glutarate, molybdenum trichloride ditriacontanoate, molybdenum trichloride di(4-cyclododecenoate), tungsten tetrachloride distearate, tungsten diiodide tetralaurate, and the like. The most preferred metal complexes are those of molybdenum such as $Mo(stearate)_2(NO)_2Cl_2$ and $Mo(stearate)_2Cl_3$.

The transition metal compounds which are applicable for use as the (a) component of the catalyst system of the present invention are generally compounds which are available or which can be prepared by methods which are conventional in the art.

In many instances, the suitable (a) component need not be an isolated complex compound but can, for convenience and economy, simply be the admixture of a suitable, relatively simple, compound of a transition metal and one or more complexing agents. Thus, under complex-forming conditions, the admixture of these ingredients, complete with the diluent which is generally used to facilitate the mixing, can frequently be utilized without additional separation, isolation, or other treatment. For example, a suitable (a) component can be the admixture obtained by bubbling NO through a cyclohexane solution of molybdenum trichloride distearate.

When it is desired to prepare and utilize transition metal complex compounds in the form of nonisolated admixtures of its components, a transition metal compound and one or more complexing agents are merely combined in proportions and under conditions of temperature and time which permit the catalytically active transition metal complex to be formed, generally in a diluent in which the components are at least partly soluble. Suitable transition metal starting compounds, for example, are halides, oxyhalides, carbonyls, carbonyl halides, or salts of inorganic or organic acids, preferably halides.

Some specific examples of suitable transition metal complex (a) components are: $(triphenylphosphine)_2(NO)_2MoCl_2$, $(pyridine)_2(NO)_2MoCl_2$, NO-treated $(triphenylphosphine)_2MoCl_4$, NO-treated $(pyridine)_2MoCl_4$, NO-treated $(butyronitrile)_2MoCl_4$, NO-treated pyridine-treated $MoCl_5$, $Mo(benzoate)_2(NO)_2Cl_2$, NO-treated $(acetylacetonate)_2MoO_2$, NO-treated $(butyronitrile)_2MoCl_4$, NO-treated $MoOCl_3$, NO-treated tetrallyltin-treated $MoCl_5$, NOCl-treated $MoO_2$, NO-treated $MoCl_5$, NO-treated (cyclopentadienyl)-$Mo(CO)_3I$, NOCl-treated pyridine-treated $MoO_2$, NO-treated $(stearate)_2MoCl_3$, NO-treated tributylphosphine-treated $MoCl_5$, NO-treated $MoCl_2$, NO-treated thiophene-treated $MoCl_5$, NO-treated $WCl_6$, NO-treated pyridine-treated $WCl_6$, NO-treated $MoO_2$, NO-treated benzoic acid-treated $WCl_6$, NOCl-treated $(triphenylphosphine)_2W(CO)_4$, $(triphenylphosphine)_2$-$(NO)_2WCl_2$, NO-treated $Mo(acetate)_2$, $(triphenylphosphine)_2ReOCl_3$, $(triphenylphosphine)_2ReCl_4$, $(triphenylphosphine)_2ReOBr_3$, $(acetylacetonate)_4Re_2Cl_4$, $(triphenylphosphine)ReOBr_3$, CO-treated triphenylphosphine-treated $RuCl_3$, NO-treated $RuCl_3$, $(triphenylphosphine)_4(CO)_2Ru_2(SnCl_3)Cl_3$, NO-treated triphenylphosphine-treated $RuCl_3$, NOCl-treated $(triphenylphosphine)_3RhCl$, NO-treated $(triphenylphosphine)_3RhCl$, $(\pi-allyl)_2RhCl$, NO-treated triphenylphosphine-treated $RhCl_3$, $(triphenylphosphine)_3Cu_2Cl_2$, $(triphenylphosphine)AuCl$, $[(triphenylphosphine(AgBr)]_x$, $(triphenylphosphine)Cr(CO)_4$, $(triphenylphosphine)_2MoCl_4$, $SmCl_3$, $ThCl_4$, $UCl_3$, $UCl_4$, $(cyclopentadienyl)TiCl_3$, pyridine-treated $TiCl_4$, $(acetylacetonate)_4Zr$, NO-treated benzoic acid-treated $NbCl_5$, NO-treated $(triphenylphosphine)_2CoCl_2$, NO-treated triphenylphosphine-treated $IrCl_3$, NO-treated CO-treated triphenylphosphine-treated $IrCl_3$, and the like, and mixtures thereof.

The formula $[(L)_a(L')_bM_cZ_d]_x$ is used herein to identify the product obtained by the admixture, under catalyst forming conditions, of the metal compound with one or more ligand-forming materials whether or not the components are present in the complex as indicated in the formula.

When the (a) component of the catalyst system is the product obtained by combining a compound of a transition metal, as hereinbefore discussed, with one or more suitable ligand-forming materials, these materials are simply combined under conditions of time and temperature which permit the complex to be formed. In general, excessively high temperatures at which the reagents tend to decompose, or excessively low temperatures, at which the reagents tend to crystallize or otherwise tend to become unreactive, should be avoided. The molar proportion of transition metal salt to the selected ligand-former can be in the range of from about 0.1:1 to about 10:1, preferably from about 0.2:1 to about 2:1. The products are obtained by combining these ingredients at a temperature preferably in the range of from about −25° to about 130° C, more preferably 0° to about 60° C, for a time in the range of from a few seconds up to about 24 hours, preferably in the presence of a diluent in which the components of the admixture are at least partially soluble. Any convenient diluent such as carbon tetrachloride, methylene chloride, xylene, cyclohexane, isooctane, benzene, chlorobenzene, and the like, can be used for this purpose. Any order of addition can be used. Such product need not be isolated but the mixture can be used directly in the formation of the catalyst system.

In general, the (*a*) component of the catalyst system is fully prepared before contact is made with the (*b*) component. It is sometimes desirable to remove excess or unreacted NO or nitrosylhalides from the (a) component before contact is made with the (*b*) component. Such removal can be conveniently carried out by warming the complex under reduced pressure to evaporate the NO or nitrosylhalide. Such removal of this excess reagent is not a necessity, but is frequently desirable, because the excess reagent appears to consume some of the (*b*) component which is added later. For this reason, grossly excessive amounts of any of the complexing agents should be avoided.

The (*b*) component of the homogeneous catalyst is an organometallic adjuvant selected from : (1) $R_3AlK_f$, (2) a mixture of compounds of (1), (3) a mixture of one or more of $AlX_3$ or $R_eAlX_f$ compounds with one or more compounds having the formula $R_a{}^1M^1X_n$, (4) an $R_aM^1Y_h$ compound, (5) an $AlX_3$ compound, or (6) $M^2M^1H_j$ compound wherein each R is an aromatic or saturated aliphatic hydrocarbon radical having up to 20 carbon atoms including alkoxy and halo derivatives thereof, preferably an alkyl radical having up to 10 carbon atoms; each $R^1$ is hydrogen or R; each X is a halogen; Y is halogen or hydrogen; each $M^1$ and $M^2$ is a metal of Group IA, IIA, IIB or IIIA, except Al; $e$ is 1, 2, or 3; $f$ is 0, 1 or 2, the sum of $e$ and $f$ being 3; $g$ is 1, 2 or 3, $h$ is 0, 1 or 2, the sum of $g$ and $h$ being equal to the valence of $M^1$, $j$ is an integer such that $b$ is equal to the sum of the valences of $M^1$ and $M^2$.

Some specific examples of $R_eAlX_f$ and $AlX_3$ compounds are: methylaluminum sesquichloride, methylaluminum dichloride, dimethylaluminum fluoride, ethylaluminum dichloride, aluminum trichloride, ethylaluminum sesquichloride, diethylaluminum chloride, di(3-ethoxypropyl)aluminum bromide, di(methoxymethyl)aluminum bromide, n-pentylaluminum dichloride, n-aluminum tribromide, di(2-ethylhexyl)aluminum bromide, phenylaluminum dichloride, benzylaluminum diiodide, di(4,4,4-trifluorobutyl)aluminum chloride, dieicosylaluminum bromide, and the like, and mixtures thereof.

Some specific examples of the $R_a{}^1M^1X_n$ and $R_aM^1Y_h$ compounds are: phenyllithium, benzylrubidium, methylsodium, t-butylpotassium, lithium hydride, anthrylcesium, ethylberyllium hydride, methylcadmium chloride, diethylzinc, diethyl magnesium, dicyclohexylmercury, methylgallium dibromide, dimethylbarium, triethylindium, triisopropylthallium, dimethylcalcium, dimethylmagnesium, dimethylstrontium, hexylzinc iodide, and the like, and mixtures thereof. Some specific examples of $M^2M^1H_j$ are: lithium aluminum hydride, lithium borohydride, or the like.

Presently preferred (b) adjuvant components of the catalytic system are those shown in (1) and (2), particularly adjuvants such as those represented by $R_3Al_2X_3$, and $RAlX_2$. Adjuvants such as methylaluminum sesquichloride, diethylaluminum chloride, and ethylaluminum dichloride are frequently favored because they generally provide increased catalytic activity.

The elements referred to herein are in accordance with the Periodic Table of Elements appearing in Handbook of Chemistry and Physics, Chemical Rubber Company, 45th edition (1964), page B-2.

The above-described (a) and (b) components of the catalyst system are combined, in suitable proportions as discussed below, at any convenient temperature within the range of −80° to about 100° C, preferably 0°–60° C for a few seconds or for periods of up to several hours, in the presence of an inert diluent in which both the components are at least partially soluble, for example, chlorobenzene, methylene chloride, ethylene chloride, benzene, xylene, toluene, cyclohexane, and the like. The combination occurs very readily. Ordinarily, the mixing is carried out in an inert atmosphere free of air or moisture. After the catalytic mixture is formed, it need not be isolated, but can be added directly to the reaction zone as a solution or dispersion in the diluent. If desired, the (a) and (b) components can be separately added, in any order, to the reaction zone either in the presence or absence of the reactants.

The process of modifying the molecular weight of the unsaturated polymer is carried out by simply contacting the polymer with the selected olefin disproportionation catalyst. As discussed previously, heterogeneous catalysts generally effect the reduction in molecular weight of the polymer. When reduction in molecular weight of the polymer is desired and the (a) component of the heterogeneous catalyst does not include therein the NO ligand, the molar ratio of the (b) component to the (a) component is in the range of from about 0.1:1 to about 20:1, preferably about 0.25:1 to about 5:1. The greatest reduction occurs when the ratio of (b) to (a) is in the range of about 0.1 to about 1.25 to 1.

In order to achieve reduction of molecular weight using an (a) component containing the (L′) ligand NO, the ratio of (b) to (a) is in the range of from about 1.6:1 to about 20:1. The greatest reduction occurs when the ratio is in the range of from about 2.0:1 to about 3.5:1. In order to achieve an increase in the molecular weight of the polymer, the ratio of (b) component to the NO-containing (a) component is in the range of from about 0.1:1 to about 1.5:1. Of course, there will be a point where the ratio of (b) to (a) is such that no inherent viscosity change occurs. The catalyst level of the homogeneous catalyst system is conveniently based on the amount of organometallic compound employed, and is generally in the range of 0.15 to 150 gram millimoles per 100 grams of polymer.

The homogeneous catalysts of this invention can be deposited upon a suitable support or carrier and used in the conversion reaction, preferably where the polymer is in solution. Catalyst supports include solid, inorganic or organic materials conventionally used as catalyst supports or carriers such as silica, alumina, silica-alumina, titania, boria, zeolites, ion exchange resins, solid polymers containing functional groups such as those prepared by the polymerization of 4-vinylpyridine, vinyl dimethylphosphine, and the like.

The support can be impregnated with the homogeneous catalyst by wetting the support with a solution of the catalyst in a solvent which is then evaporated. The support can also be impregnated with either the (a) or (b) component and the remaining component can be added later. For example, the solid support material can be impregnated with the (a) component and the resulting composite conveniently stored until required. Just prior to use, the composite can be treated with the (b) component, or, if the reaction is in the liquid phase, the (b) component can simply be added to the reaction zone. Among solvents suitable are relatively low-boiling organic solvents such as pentane, methylene chloride, cyclohexane, and the like. The amount of catalyst added to the support will be from 0.1 to about 30 weight per cent of the total of the catalyst and support. If the support is to be activated by calcination, it is usually activated prior to the impregnation step.

Impregnation and evaporation conditions in preparing the catalyst are conventional, being carried out at temperatures up to about 150° C.

The treatment of the polymer in the presence of the disproportionation catalyst systems mentioned above and the presence of the olefin is generally effected in a solution of the polymer. When the polymer is prepared in solution in the presence of an organometallic catalyst system, a homogeneous disproportionation catalyst can be used immediately after polymerization without inactivation of the polymerization catalyst by adding the disproportionation catalyst and olefin to the polymerization reactor effluent. When a heterogeneous supported disproportionation catalyst is employed, the polymer in the polymerization reaction diluent can be contacted with the supported disproportionation catalyst by methods which are known to those skilled in the art. It is also within the scope of the invention to dissolve a previously isolated polymer in a suitable diluent, e.g., hydrocarbon diluent such as is used for the polymerization of the polymer and subsequently contact the polymer solution with the homogeneous or heterogeneous disproportionation catalysts.

The temperature at which the polymers are contacted with the olefin in the presence of the disproportionation catalysts mentioned above is generally in the range of 50°–250° F. The treating time is dependent upon the temperature and can range from 1 minute or less to 100 hours or more. For most purposes, the treating time is less than 25 hours and in many instances the desired results are obtained in less than 5 hours, depending upon the nature of the starting polymer, e.g., rubbery or resinous, and on the extent of treatment with the olefin according to the invention. Pressures employed are advantageously in the range of from 1–100 atmospheres, although atmospheric pressure is preferred.

The modified molecular weight products have utility as elastomers, thermoplastic resins, very soft rubbers or plastics, or liquids of various types. As elastomers, the products can be vulcanized in conventional curing systems with or without added fillers and extender oils to produce tire tread or carcass stock, gaskets, hose, tubing, or molded rubber goods. As thermoplastics, the products can also be compounded with known stabilizers, fillers, plasticizers and the like to produce molded or extruded containers, tubing, film, machine parts, toys, and the like. The very soft products can be compounded in conventional recipes to produce scalants, coating compositions, calking compounds, putties, mastics, and the like. Liquid products can be employed as plasticizers for various polymers, as potting compounds in the electrical industry, and can be compounded with tackifiers, fillers, stabilizers, and the like for adhesive applications. The liquid products can also serve as intermediates in the manufacture of surface active agents, epoxy resin crosslinking agents and the like.

When a polymer is treated in accordance with the invention and the reaction allowed to proceed for a sufficient length of time, the product results in a nonconjugated polyene which is often difficult and expensive to prepare by other methods. These nonconjugated polyenes can be employed as intermediates for the synthesis of various types of compounds and also as monomers. One use is as termonomers for the production of ethylene/propylene rubber.

The following examples are presented for the purpose of illustrating the above-described invention. However, the data included therein should not be construed to limit the spirit or scope of the invention.

EXAMPLE I

Rubbery polybutadiene was treated with propylene in the presence of ethylaluminum sesquichloride and the reaction product of molybdenum trichloride distearate and nitric oxide as the catalyst. The molybdenum trichloride distearate employed as a catalyst component was prepared by reacting stearic acid with molybdenum pentachloride in cyclohexane. The recipe was as follows:

| | |
|---|---|
| Cyclohexane, ml | 500 |
| Stearic acid, grams | 100 (0.35 mol) |
| Molybdenum pentachloride, grams | 50 (0.18 mol) |

The materials were charged to a reactor which was then purged with nitrogen for 10 minutes. The temperature was adjusted to 122° F and maintained at this level for 15 hours. The reactor was then vented and purged with nitrogen for 15 minutes. The molybdenum trichloride distearate thus formed was soluble in cyclohexane. A vessel containing the molybdenum trichloride distearate was pressured to 30 psig with NO for approximately 1 hour at room temperature (about 75° F) to obtain the reaction product used for the transition metal component in the catalyst system.

Rubbery polybutadiene was prepared using the following recipe:

| | |
|---|---|
| 1,3-Butadiene, parts by weight | 100 |
| Cyclohexane, parts by weight | 800 |
| n-Butyllithium, mhm | 1.1 |
| Temperature, ° F | 158 |
| Time, hours | 1 | mhm =gram millimoles per 100 grams monomer

The procedure was as follows. Cyclohexane was charged, the reactor was flushed with nitrogen, butadiene was added, and then the butyllithium. A sample of the reaction mixture was withdrawn and inherent viscosity and gel were determined on the recovered parent polymer. The product was gel free and had an inherent viscosity of 1.58. The remainder of the polymerization mixture was cooled to room temperatures (about 75° F) and the following materials were added:

| | |
|---|---|
| Propylene, parts by weight | 10 |
| Ethylaluminum sesquichloride, mhm | 6 |
| MoCl$_3$(stearate)$_2$ +NO, mhm(1) | 1 |
| Temperature, ° F | 86 |
| Time, hours | 1 |

(1)Based on molybdenum content

Subsequently, the reaction was shortstopped with 1 part by weight per 100 parts by weight rubber of 2,2′-methylene-bis(4-methyl-6-tert-butylphenol), added as a 10 weight per cent solution in a mixture of equal volumes of isopropyl alcohol and toluene. The product was then coagulated in isopropyl alcohol, separated, and dried. A control run was made for the polymerization of butadiene as described above. It was not treated with propylene. Mooney values, inherent viscosity and gel were determined on the treated and untreated products. No incorporated propylene was detected when the treated product was examined by infrared. Results were as follows:

| | Parent Untreated | Treated | Control Untreated |
|---|---|---|---|
| Inherent Viscosity | 1.58 | 0.95 | 1.63 |
| Gel, % | 0 | 0 | 0 |
| ML-4 at 212° F | — | <2 | 12 |

These data show that treatment with propylene effected a substantial reduction in molecular weight of the polybutadiene.

EXAMPLE II

Using a procedure similar to Example I, polybutadiene was prepared and treated with the following catalysts in presence of 1-hexene: molybdenum trichloride dioctanoate and ethylaluminum sesquichloride; and molybdenum trichloride dioctanoate treated with nitric oxide and ethylaluminum sesquichloride. Relevant data are summarized in Table I.

TABLE I

| | Parts, by weight (Mmoles) | |
|---|---|---|
| | A | B |
| Polybutadiene | 100 | 100 |
| Cyclohexane | 800 | 800 |
| 1-Hexene | 10 | 10 |
| Ethylaluminum sesquichloride | variable | variable |
| Molybdenum trichloride di-octanoate (A) | (1.0 mmole) | — |
| Molybdenum trichloride di-octanoate treated with nitric oxide (B) | — | (1.0 mmole) |
| Temperature, F | 158 | 158 |
| Time, hours | 1 | 1 |

| | | Results | |
|---|---|---|---|
| Recipe | $Et_3Al_2Cl_3$ Mmoles | Inherent Viscosity | Cold Flow Mg/Min |
| Control[a] | | 1.55 | 82 |
| A | 0.5 | 0.32 | Too high to measure |
| A | 1.0 | 0.49 | Too high to measure |
| A | 1.5 | 1.14 | 320 |
| A | 2.0 | 1.34 | 104 |
| A | 3.0 | 1.28 | 46 |
| A | 4.0 | 1.24 | 62 |
| Control[a] | | 1.69 | 60 |
| B | 0.5 | 2.04 | 2.0 |
| B | 1.0 | 1.96 | 4.0 |
| B | 1.5 | 1.76 | 7.7 |
| B | 2.0 | 1.12 | 197 |
| B | 3.0 | 1.24 | 132 |

[a] Untreated polybutadiene control.

The data of the above table illustrates the reduction of molecular weight as measured by inherent viscosity which is obtained using the above catalysts and 1-hexene when treating the polybutadiene. Increase in I.V. using the NO-treated molybdenum trichloride distearate component occurred at ratios 0.5:1 to 1.5:1, EASC to the stearate. Similar results to those of recipe A were obtained when polyisoprene was treated with molybdenum trichloride distearate and ethylaluminum dichloride.

In the above examples, I.V. values were determined according to the procedure of U.S. Pat. No. 3,278,508 (1966), Kahle et al., at Column 20, footnotes (a) and (b). The ML-4 values were determined by the method of ASTM D-1646-63. Cold flow is measured by extruding the polymer through a ¼ orifice at 3.5 psi pressure and a temperature of 50° C. After allowing 10 minutes to reach a steady state, the rate of extrusion is measured and reported in mg/min.

It is not necessary that the polymers be unquenched, i.e., polymerization catalyst not inactivated, in order to effect the reduction in molecular weight of the polymer. Quenched polymers can be stripped of solvent or diluent, dried, stored indefinitely, redissolved in a suitable solvent, and treated with the olefin disproportionation catalyst and a suitable olefin with substantially the same result as discussed above in the examples.

Reasonable variation and modifications of this invention are possible without departing from the spirit and scope thereof.

I claim:
1. A process for decreasing the molecular weight of a polymer capable of having said molecular weight thereof decreased, said polymer characterized by a carbon backbone and internal carbon-carbon unsaturation in the polymer backbone, said process comprising contacting said polymer with a lower molecular weight olefin in the presence of an olefin disproportionation nitrosyl-ligand-containing homogeneous catalyst under conditions of temperature, pressure, and contact time sufficient to decrease the molecular weight of said polymer, wherein said lower molecular weight olefin is a non-tertiary nonconjugated acyclic mono- or polyene having 2 to 30 carbon atoms per molecule, wherein said nitrosyl ligand-containing homogeneous catalyst comprises (a) a transition metal compound with (b) an adjuvant in ratios of (b):(a) effective for said decreasing;

wherein a. said transition metal compound is represented by the formula $[(L)_a(L')_bM_cZ_d]_x$ wherein each (L) and (L') are ligands; M is a transition metal of Group IB, IIIB, IVB, VB, VIB, VIIB, or the iron and cobalt subgroups of Group VIII; Z is halide or a radical which is CN, SCN, OCN, or $SnCl_3$; $a$ and $d$ are numbers 0–6, $b$ is 1 or 2, $c$ is 1–4; $x$ is a number indicative of the polymeric state of the compound, which is 1 to 3 or higher; said $[(L)_a(L')_bM_cZ_d]_x$ represents a product obtained by combining at least one transition metal compound with at least one ligand-forming material; and wherein the number of (L), (L'), and Z groups present in the component (a) compound is not greater than the number required for the metal to achieve the closed shell electronic configuration of the next higher atomic number inert gas; (L) ligands are organic ligands, O, S, or CO; (L') ligands are NO or [π-($CHR^4$—$CR^4$—$CH_2$—)] such that at least one L' is NO; and b. said adjuvant is represented by the formula
   1. $R_eAlX_f$;

2. a mixture of the compounds of (1)
3. a mixture of one or more of $AlX_3$ or $R_eAlX_f$ compounds with one or more compounds having the formula $R_g^1M^1X_h$;
4. an $R_gM^1Y_h$ compound;
5. an $AlX_3$ compound; or
6. $M^2M^1H_j$ compound wherein each R is an aromatic or saturated aliphatic hydrocarbon radical having up to 20 carbon atoms including alkoxy and halo derivatives thereof, preferably an alkyl radical having up to 10 carbon atoms; each $R^1$ is hydrogen or R; each X is a halogen; Y is halogen or hydrogen; each $M^1$ and $M^2$ is a metal of Group IA, IIA, IIB or IIIA; $e$ is 1, 2 or 3, $f$ is 0, 1 or 2, the sum of $e$ and $f$ being 3; $g$ is 1, 2 or 3, $h$ is 0, 1 or 2, the sum of $g$ and $h$ being equal to the valence of $M^1$; $j$ is an integer such that $b$ is equal to the sum of the valences of $M^1$ and $M^2$.

2. A process for decreasing the molecular weight of a polymer capable of having said molecular weight thereof decreased, said polymer characterized by a carbon backbone and internal carbon-carbon unsaturation in the polymer backbone, said process comprising contacting said polymer with a lower molecular weight olefin in the presence of an olefin disproportionation nitrosylligand-containing homogeneous catalyst under conditions of temperature, pressure, and contact time sufficient to cause decrease of the molecular weight of said polymer, wherein said lower molecular weight olefin is a nontertiary nonconjugated acyclic mono- or polyene having 2 to 30 carbon atoms per molecule, wherein said nitrosyl ligand-containing homogeneous catalyst comprises (a) a transition metal compound with (b) an adjuvant in ratios of (b):(a) effective for said decreasing;

wherein a. said transition metal compound is represented by the formula $[(L)_a(L')_bM_cZ_d]_x$ wherein each (L) and (L') are ligands; M is a transition metal of Group IB, IIIB, IVB, VB, VIB, VIIB, or the iron and cobalt subgroups of Group VIII; Z is halide or a radical which is CN, SCN, OCN, or $SnCl_3$; $a$ and $d$ are numbers 0–6, $b$ is 1 or 2, $c$ is 1–4; $x$ is a number indicative of the polymeric state of the compound, which is 1 to 3 or higher; said $[(L)_a(L')_bM_cZ_d]_x$ represents a product obtained by combining at least one transition metal compound with at least one ligand-forming material; and wherein the number of (L), (L'), and Z groups present in the component (a) compound is not greater than the number required for the metal to achieve the closed shell electronic configuration of the next higher atomic number inert gas; (L) ligands are $R_3Q$, $R_3QO$, $R_2Q-QR_2$, $R_2NR^1$, O, S, CO, $R_2N-R^2-NR_2$, R—S—R, $R^3S$, [π-($CHR^4-CR^4-CH_2$—)], $R^5(CN)_k$, $R^5$ (COO—)$_k$, $RCOR^6(COO-)_k$, [$(RCO)_2CH$—], $R_2NCSS$—), unsubstituted and $R^5$ group-substituted pyridine, unsubstituted and $R^5$ group-substituted bipyridine, or unsubstituted and R group-substituted cyclopentadienyl radicals; wherein R is an aromatic or saturated aliphatic radical, including halo and alkoxy substituted derivatives thereof, having up to 20 carbon atoms; $R^1$ is hydrogen or an R radical; $R^2$ is a divalent radical; $R^3$ is a divalent saturated aliphatic or ethylenically unsaturated aliphatic radical having from 4 to 10 carbon atoms; $R^4$ is hydrogen or methyl radical; $R^5$ is an aromatic, saturated aliphatic, or ethylenically unsaturated aliphatic radical having up to 30 carbon atoms; $R^6$ is a divalent saturated aliphatic radical having from 1 to 10 carbon atoms; Q is phosphorus, arsenic, or antimony; and $k$ is 1 to 2; (L') ligands are NO or [π—($CHR^4-CR^4-CH_2$—)] such that at least one L' is NO; and b. said adjuvant is represented by the formula
1. $R_eAlX_f$;
2. a mixture of the compounds of (1);
3. a mixture of one or more of $AlX_3$ or $R_eAlX_f$ compounds with one or more compounds having the formula $R_g^1M^1X_h$;
4. an $R_gM^1Y_h$ compound;
5. an $AlX_3$ compound; or
6. $M^2M^1H_j$ compound wherein each R is an aromatic or saturated aliphatic hydrocarbon radical having up to 20 carbon atoms including alkoxy and halo derivatives thereof, preferably an alkyl radical having up to 10 carbon atoms; each $R^1$ is hydrogen or R; each X is a halogen; Y is halogen or hydrogen; each $M^1$ and $M^2$ is a metal of Group IA, IIA, IIB or IIIA; $e$ is 1, 2 or 3, $f$ is 0, 1 or 2, the sum of $e$ and $f$ being 3; $g$ is 1, 2 or 3, $h$ is 0, 1 or 2, the sum of $g$ and $h$ being equal to the valence of $M^1$; $j$ is an integer such that $b$ is equal to the sum of the valences of $M^1$ and $M^2$.

3. The process of claim 2 wherein said polymer has an initial weight-average molecular weight of about 1,000 to about 10,000,000 and an average of about 0.25 to about 1 internal double bond per monomer unit incorporated into the polymer.

4. A process according to claim 2 wherein said polymer is a polymer of a conjugated diene, a copolymer of two or more conjugated dienes or a copolymer of a conjugated diene and a vinyl monomer wherein the conjugated diene has 4 to 12 carbon atoms per molecule.

5. The process of claim 4 wherein said contacting with said polymer is at a temperature of about 50° to 250° F, under a pressure of about 1 to 100 atmospheres.

6. The process according to claim 4 wherein the molar ratio of said (b) component to (a) component is about 1.6:1 to 20:1.

7. A process according to claim 6 wherein said M is molybdenum, tungsten, rheniun, ruthenium, or rhodium.

8. The process of claim 4 wherein said nitrosyl ligand-containing homogeneous catalyst is formed on admixture of (a) molybdenum trichloride dioctanoate with NO or molybdenum trichloride distearate with NO and (b) ethylaluminum sesquichloride, and the lower molecular weight olefin is 1-hexene or propylene.

9. A process according to claim 8 wherein the polymer is a homopolymer of 1,3-butadiene or isoprene.

10. The process of claim 4 wherein said polymer is prepared in solution in the presence of an organometallic catalyst system, and said homogeneous disproportionation catalyst and said olefin are employed without inactivation of the polymerization catalyst by adding said disproportionation catalyst and said olefin to the polymerization reaction effluent.

11. The process of claim 4 wherein said (a) transition metal complex is (triphenylphosphine)$_2$(NO)$_2$MoCl$_2$, (pyridine)$_2$(NO)$_2$MoCl$_2$, NO-treated (triphenylphosphine)$_2$MoCl$_4$, NO-treated (pyridine)$_2$MoCl$_4$, NO-treated (butyronitrile)$_2$MoCl$_4$, NO-treated pyridine-treated MoCl$_5$, Mo(benzoate)$_2$(NO)$_2$Cl$_2$, NO-treated (aceylacetonate)$_2$MoO$_2$, NO-treated (butyronitrile)$_2$MoCl$_4$, NO-treated MoOCl$_3$, NO-treated tetrallyltin-treated MoCl$_5$, NOCl-treated MoO$_2$, NO-treated MoCl$_5$, NO-treated (cyclopentadienyl)Mo(CO)$_3$I, NOCl-treated pyridine-treated MoO$_2$, NO-treated (stearate)$_2$MoCl$_3$, NO-treated tributylphosphine-treated MoCl$_5$, NO-treated MoEl$_2$, NO-treated thiophene-treated MoCl$_5$, NO-treated WCl$_6$, NO-treated pyridine-treated WCl$_6$, NO-treated MoO$_2$, NO-treated benzoic acid-treated WCl$_6$, NOCl-treated (triphenylphosphine)$_2$W(CO)$_4$, (triphenylphosphine)$_2$(NO)$_2$WCl$_2$, NO-treated Mo(acetate)$_2$, NO-treated RuCl$_3$, NO-treated triphenylphosphine-treated RuCl$_3$, NOCl-treated (triphenylphosphine)$_3$RhCl, NO-treated (triphenylphosphine)$_3$RhCl, NO-treated triphenylphosphine-treated RhCl$_3$, NO-treated benzoic acid-treated NbCl$_5$, NO-treated (triphenylphosphine)$_2$CoCl$_2$, NO-treated triphenylphosphine-treated IrCl$_3$, or NO-treated CO-treated triphenylphosphine-treated IrCl$_3$.

12. The process of claim 4 wherein said (b) organometal compound is methylaluminum sesquichloride, methylaluminum dichloride, dimethylaluminum fluoride, ethylaluminum dichloride, aluminum trichloride, ethylaluminum sesquichloride, diethylaluminum chloride, di(3-ethoxypropyl)aluminum bromide, di(methoxymethyl)aluminum bromide, n-pentylaluminum dichloride, aluminum tribromide, di-(2-ethylhexyl)aluminum bromide, phenylaluminum dichloride, benzylaluminum diiodide, di(4,4,4-trifluorobutyl)aluminum chloride, dieicosylaluminum bromide, phenyllithium, benzylrubidium, methylsodium, t-butylpotassium, lithium hydride, anthrylcesium, ethylberyllium hydride, methylcadmium chloride, diethylzinc, diethyl magnesium, dicyclohexylmercury, methylgallium dibromide, dimethylbarium, triethylindium, triisopropylthallium, dimethylcalcium, dimethylmagnesium, dimethylstrontium, hexylzinc iodide, lithium aluminum hydride, or lithium borohydride.

13. A process for decreasing the molecular weight of a polymer capable of having said molecular weight thereof decreased, said polymer characterized by an initial weight-average molecular weight of about 1,000 to 10,000,000, a substantially carbon backbone, and internal carbon-carbon unsaturation in said polymer backbone, said process comprising contacting said polymer with a lower molecular weight olefin in the presence of a homogeneous olefin disproportionation catalyst under conditions of temperature, pressure, and contact time sufficient to decrease the molecular weight of said polymer, wherein said lower molecular weight olefin is a nontertiary nonconjugated acyclic mono- or polyene of 2 to 30 carbon atoms per molecule, and said homogeneous olefin disproportionation catalyst comprises (a) a nitrosyl-ligand-containing transition metal compound and (b) a reducing agent, wherein said (a) nitrosyl-ligand-containing transition metal compound is represented by the formula $[(L)_9(1'_bM_cZ_d]_x$ wherein each of (L) and (L') are ligands; M is a transition metal of Group IB, IIIB, IVB, VB, VIB, VIIB, or the iron or cobalt subgroups of Group VIII; Z is halide or CN, SCN, OCN, or SnCl$_3$; $a$ and $d$ each represent a whole number 2—] such that at 0 to 6, $b$ represents a whole number of 1 or 2, $c$ represents a whole number of 1 to 4; $x$ is a number indicative of the polymeric state of the compound; the number of L, L' and Z groups present is not greater than the number required for the metal to achieve the closed shell electronic configuration of the next higher atomic number inert gas; (L) ligands are organic, O, S or CO; (L') ligands are NO or [$\pi$—(CH-R$^4$—CR$^4$—CH$_2$')] such that least one L' is NO; wherein said $[(L)_a(L')_bM_cZ]_x$ represents a product obtained by combining at least one transition metal compound with at least one ligand-forming material employing a molar ratio of said transition metal compound to ligand-forming material of about 1.6:1 to 20:1, and wherein said (b) reducing agent comprises
1. R$_e$AlX$_f$;
2. a mixture of the compounds of (1);
3. a mixture of one or more of AlX$_3$ or R$_e$AlX$_f$ compounds with one or more compounds having the formula R$_g$$^1$M$^1$X$_h$;
4. an R$_g$M$^1$Y$_h$ compound;
5. an AlX$_3$ compound; or
6. M$^2$M$^1$H$_j$ compound wherein each R is an aromatic or saturated aliphatic hydrocarbon radical having up to 20 carbon atoms including alkoxy and halo derivatives thereof, preferably an alkyl radical having up to 10 carbon atoms; each R$^1$ is hydrogen or R; each X is a halogen; Y is halogen or hydrogen; each M$^1$ and M$^2$ is a metal of Group IA, IIA, IIB or IIIA; $e$ is 1, 2 or 3, $f$ is 0, 1 or 2, the sum of $e$ and $f$ being 3; $g$ is 1, 2 or 3, $h$ is 0, 1 or 2, the sum of $g$ and $h$ being equal to the valence of M$^1$; $j$ is an integer such that $b$ is equal to the sum of the valences of M$^1$ and M$^2$.

14. A process for decreasing the molecular weight of a polymer capable of having said molecular weight thereof decreased, said polymer characterized by an initial weight-average molecular weight of about 1,000 to 10,000,000, a substantially carbon backbone, and internal carbon-carbon unsaturation in said polymer backbone, said process comprising contacting said polymer with a lower molecular weight olefin in the presence of a homogeneous olefin disproportionation catalyst under conditions of temperature, pressure, and contact time sufficient to decrease the molecular weight of said polymer, wherein said lower molecular weight olefin is a nontertiary nonconjugated acyclic mono- or polyene of 2 to 30 carbon atoms per molecule, and said homogeneous olefin disproportionation catalyst comprises (a) a nitrosyl-ligand-containing transition metal compound and (b) a reducing agent, wherein said (a) nitrosyl-ligand-containing transition metal compound is represented by the formula $[(L)_a(L')_bM_cZ_d]_x$ wherein each of (L) and (L') are ligands; M is a transition metal of Group IB, IIIB, IVB, VB, VIB, VIIB, or the iron or cobalt subgroups of Group VIII; Z is halide or CN, SCN, OCN, or SnCl$_3$; $a$ and $d$ each represent a whole number of 0 to 6, $b$ represents a whole number of 1 or 2, $c$ represents a whole number of 1 to 4; $x$ is a number indicative of the polymeric state of the compound; the number of L, L' and Z groups present is not greater than the number required for the metal to achieve the closed shell electronic configuration of the next higher atomic number inert gas;

(L) ligands are $R_3Q$, $R_3QO$, $R_2Q$—$QR_2$, $R_2NR^1$, O, S, CO, $R_2N$—$R^2$—$NR_2$, R—S—R, $R^3S$, [$\pi$—(CHR$^4$—CR$^4$—CH$_2$)], $R^5(CN)_k$, $R^5O$—, $R^5(COO$—$)_k$, $RCOR^6(COO$—$)_k$, [$(RCO)_2CH$—], $(R_2NCSS$—), unsubstituted and $R^5$ group-substituted pyridine, unsubstituted and $R^5$ group-substituted bipyridine, or unsubstituted and R group-substituted cyclopentadienyl radicals; wherein R is an aromatic or saturated aliphatic radical, including radicals substituted with groups such as halo groups or alkoxy groups and the like, having up to 20 carbon atoms; $R^1$ is hydrogen or an R radical; $R^2$ is a divalent R radical; $R^3$ is a divalent saturated aliphatic or ethylenically unsaturated aliphatic radical having from 4 to 10 carbon atoms; $R^4$ is hydrogen or methyl radical; $R^5$ is an aromatic, saturated aliphatic, or ethylenically unsaturated aliphatic radical having up to 30 carbon atoms; $R^6$ is a divalent saturated aliphatic radical having from 1 to 10 carbon atoms; Q is phosphorus, arsenic, or antimony; and k is a whole number and is 1 or 2;

(L') ligands are NO or [$\pi$—(CHR$^4$—CR$^4$—CH$_2$—)] such that at least one L' is NO; wherein said $[(L)_a(L')_bM_cZ_d]_x$ represents a product obtained by combining at least one transition metal compound with at least one ligand-forming material employing a molar ratio of said transition metal compound to ligand-forming material of about 1.6:1 to 20:1, and wherein said (b) reducing agent comprises
1. $R_eAlX_f$;
2. a mixture of the compounds of (1);
3. a mixture of one or more of $AlX_3$ or $R_eAlX_f$ compounds with one or more compounds having the formula $R_g^1M^1X_h$;
4. an $R_gM^1Y_h$ compound;
5. an $AlX_3$ compound; or
6. $M^2M^1H_j$ compound
wherein each R is an aromatic or saturated aliphatic hydrocarbon radical having up to 20 carbon atoms including alkoxy and halo derivatives thereof, preferably an alkyl radical having up to 10 carbon atoms; each $R^1$ is hydrogen or R; each X is a halogen; Y is halogen or hydrogen; each $M^1$ and $M^2$ is a metal of Group IA, IIA, IIB or IIIA; e is 1, 2 or 3, f is 0, 1 or 2, the sum of e and f being 3; g is 1, 2 or 3, h is 0, 1 or 2, the sum of g and h being equal to the valence of $M^1$; j is an integer such that b is equal to the sum of the valences of $M^1$ and $M^2$.

15. The process of claim 14 wherein said polymer is a homopolymer or copolymer of a conjugated diene, copolymer of a conjugated diene with a vinyl monomer, or polymer of a cyclic monoolefin.

16. The process of claim 14 wherein said contacting of said polymer is at a temperature of about 50° to 250° F., under a pressure of about 1 to 100 atmospheres.

17. The process of claim 16 wherein said polymer is prepared in solution in the presence of an organometallic catalyst system, said homogeneous disproportionation catalyst and said olefin are employed without inactivation of the polymerization catalyst by adding said disproportionation catalyst and said olefin to the polymerization reaction effluent.

18. The process according to claim 14 wherein said nitrosyl-ligand-containing transition metal compound is NO-treated molybdenum trichloride distearate or NO-treated molybdenum trichloride dioctanoate, and wherein said reducing agent is ethylaluminum sesquichloride.

19. The process of claim 18 wherein said polymer is polybutadiene, said olefin is 1-hexene or propylene.

20. The process of claim 14 wherein said olefin is ethylene, propylene, 1-butene, 2-butene, 1-pentene, 2-pentene, 1-hexene, 1,4-hexadiene, 2-heptene, 1-octene, 2,5-octadiene, 2-nonene, 1-dodecene, 2-tetradecene, 1-hexadecene, 3-methyl-1-butene, 1-phenyl-2-butene, 4-octene, 3-eicosene, 3-heptene, 3-hexene, 1,4-pentadiene, 1,4,7-dodecatriene, 2-methyl-4-octene, 4-vinylcyclohexene, 1,7-octadiene, 1,5-eicosadiene, 2-triacontene, 2,6-dodecadiene, 1,4,7,10,13-octadecapentaene, 8-cyclopentyl-4,5-dimethyl-1-decene, or 6,6-dimethyl-1,4-octadiene.

21. The process of claim 14 wherein said olefin is cyclobutene, cyclopentene, cycloheptene, cyclooctene, 5-n-propylcyclooctene, cyclodecene, cyclododecene, 3,3,5,5-tetramethylcyclononene, 3,4,5,6,7-pentaethylcyclodecene, 1,5-cyclooctadiene, 1,5,9-cyclododecatriene, 1,4,7,10-cyclododecatetraene, or 6-methyl-6-ethylcyclooctadiene-1,4.

22. A process for decreasing the inherent viscosity of a carbon backbone polymer, characterized by an initial molecular weight-average molecular weight of about 1,000 to 10,000,000 and internal carbon-carbon unsaturation in the polymer backbone comprising contacting said polymer with a lower molecular weight olefin in the presence of an olefin disproportionation catalyst under conditions of temperature, pressure, and contact time sufficient to effectuate said decrease in inherent viscosity of said polymer, said lower molecular weight olefin is a nontertiary nonconjugated acyclic mono- or polyene containing 2 to 30 carbon atoms per molecule, said olefin disproportionation catalyst comprises that formed on admixture of (a) a transition metal compound and (b) an adjuvant, wherein said (a) transition metal compound is represented by the formula $[(L)_a(NO)_bM_cZ_d]_x$ wherein each (L) represents a ligand; M is a transition metal of Group IB, IIIB, IVB, VB, VIB, VIIB, or the iron and cobalt subgroups of Group VIII: Z is halide or a radical which is CN, SCN, OCN, or $SnCl_3$; a and d are numbers 0 to 6, b is 1 or 2, c is 1 to 4; x is a number indicative of the polymeric state of the compound; wherein said $[(L)_a(NO)_bM_cZ_d]_x$ represents a product obtained by combining at least one transition metal compound with at least one ligand-forming material, and wherein the number of (L), (NO), and Z groups present in the component (a) compound is not greater than the number required for the metal to achieve the closed shell electronic configuration of the next higher atomic number inert gas; (L) ligands are $R_3Q$, $R_3QO$, $R_2Q$—$QR_2$, $R_2NR^1$, O, S, CO, $R_2N$—$R^2$—$NR_2$, R-S-R, $R^3S$, [$\pi$—(CHR$^4$—CR$^4$—CH$_2$)], $R^5(CN)_k$, $R^{R5}O$—, $R^5(COO$—$)_k$, $RCOR^6(COO$—$)_k$, [$(RCO)_2CH$—], $(R_2NCSS$—), unsubstituted and $R^5$ group-substituted pyridine, unsubstituted and $R^5$ group-substituted bipyridine, or unsubstituted and R group-substituted cyclopentadienyl radicals; wherein R is an aromatic or saturated aliphatic radical, including halo and alkoxy substituted derivatives thereof, having up to 20 carbon atoms; $R^1$ is hydrogen or an R radical; $R^2$ is a divalent R radical; $R^3$ is a divalent saturated aliphatic or ethylenically unsaturated aliphatic radical having from 4 to 10 carbon atoms; $R^5$ is an aromatic, saturated aliphatic, or ethylenically unsaturated aliphatic radical having up to 30 carbon atoms; $R^6$ is a divalent saturated aliphatic radical having from 1 to 10 carbon atoms; Q is phosphorus, arsenic, or antimony; and $k$ is 1 to 2; and wherein said (b) adjuvant can be represented by the formula
1. $R_eAlX_f$;
2. a mixture of the compounds of (1);
3. a mixture of one or more of $AlX_3$ or $R_eAlX_f$ compounds with one or more compounds having the formula $R_g{}^1M^1X_n$;
4. an $R_3M^1Y$ compound;
5. an $AlX_3$ compound; or
6. $M^2M^1H_j$ compound wherein each R is an aromatic or saturated aliphatic hydrocarbon radical having up to 20 carbon atoms including alkoxy and halo derivatives thereof, preferably an alkyl radical having up to 10 carbon atoms; each $R^1$ is hydrogen or R; each X is a halogen; Y is halogen or hydrogen; each $M^1$ and $M^2$ is a metal of Group IA, IIA, IIB or IIIA; $e$ is 1, 2 or 3; $f$ is 0, 1 or 2, the sum of $e$ and $f$ being 3; $g$ is 1, 2 or 3, $h$ is 0, 1 or 2, the sum of $g$ and $h$ being equal to the valence of $M^1$, $j$ is an integer such that $b$ is equal to the sum of the valences of $M^1$ and $M^2$;

wherein the ratio of said (b):(a) is about 1.6:1 to 20:1.

23. The process of claim 21 wherein said contacting temperature is within a range of about 50° to 250° F, and said contacting pressure in the range of about 1 to 100 atmospheres.

24. The process of claim 21 wherein said catalyst further incorporates a support selected from the group consisting of silica, alumina, silica-alumina, titania, boria, zeolites, ion exchange resins, solid polymers containing functional groups such as those prepared by the polymerization of 4-vinylpyridine, or vinyl dimethylphosphine and wherein said catalyst represents about 0.1 to 30 weight percent of that of catalyst and support.

25. The process of claim 23 wherein said polymer has an initial weight-average molecular weight of about 10,000 to about 500,000 and an average of about 0.25 to about 1 internal double bond per monomer unit incorporated into the polymer.

26. A process according to claim 24 wherein said polymer is a polymer of a conjugated diene, a copolymer of two or more conjugated dienes or a copolymer of a conjugated diene and a vinyl monomer wherein the conjugated diene has 4 to 12 carbon atoms per molecule.

27. The process of claim 23 wherein said nitrosyl ligand-containing homogeneous catalyst is formed on admixture of (a) molybdenum trichloride dioctanoate with NO or molybdenum trichloride distearate with NO and (b) ethylaluminum sesquichloride, said lower molecular weight olefin is 1-hexene or propylene, and said polymer is a homopolymer of 1,3-butadiene or isoprene.

28. A process for decreasing the inherent viscosity of a carbon-backbone polymer which comprises contacting said polymer with a lower molecular weight olefin in the presence of an olefin disproportionation catalyst under conditions of temperature, pressure, and contact time sufficient to effectuate said increase in inherent viscosity of said polymer, wherein said carbon backbone polymer is characterized by an initial molecular weight-average molecular weight of about 1,000 to 10 million and internal carbon-carbon unsaturation in the polymer backbone, said lower molecular weight olefin is a nontertiary nonconjugated acyclic mono- or polyene containing 2 to 30 carbon atoms per molecule, said olefin disproportionation catalyst is a homogeneous catalyst comprising (a) NO-treated molybdenum trichloride distearate or NO-treated molybdenum trichloride dioctanoate, and (b) ethylaluminum sesquichloride, wherein the ratio of said (b) to said (a) is sufficient to enable said homogeneous catalyst to effectuate said decrease in said inherent viscosity of said polymer.

29. The process according to claim 29 wherein said ratio of said (b):(a) is about 1.6:1 to 20:1.

30. The process of claim 29 wherein said contacting temperature is about 50° to 250° F, and said contacting pressure is about 1 to 100 atmospheres.

31. The process of claim 30 wherein said polymer is polyisoprene or polybutadiene, and said olefin is propylene or 1-hexene.

32. A process for decreasing the weight-average molecular weight of a polymer capable of having said molecular weight thereof decreased, said polymer characterized by a carbon backbone, internal carbon-carbon unsaturation in the polymer backbone, and an initial weight-average molecular weight of about 1,000 to about 10,000,000 as determined by light scattering, said process comprising contacting said polymer with a lower molecular weight olefin in the presence of an olefin disproportionation nitrosyl-ligand-containing homogeneous catalyst under conditions of temperature, pressure, and contact time sufficient to decrease the molecular weight thereof, wherein said lower molecular weight olefin is a non-tertiary nonconjugated acyclic mono- or polyene having 2 to 30 carbon atoms per molecule, wherein said nitrosyl ligand-containing homogeneous catalyst comprises:

a. a transition metal compound represented by the formula $[(L)_a(L')_bM_cZ_d]_x$ wherein each (L) and (L') are ligands; M is a transition metal of Group IB, IIIB, IVB, VB, VIB, VIIB, or the iron and cobalt subgroups of Group VIII; Z is halide or a radical which is CN, SCN, OCN, or $SnCl_3$; $a$ and $d$ are numbers 0–6, $b$ is 1 or 2, $c$ is 1–4; $x$ is a number indicative of the polymeric state of the compound, which is 1 to 3 or higher; said $[(L)_a(L')_bM_cZ_d]_x$ represents a product obtained by combining at least one transition metal compound with at least one ligand-forming material; and wherein the number of (L), (L'), and Z groups present in the component (a) compound is not greater than the number required for the metal to achieve the closed shell electronic configuration of the next higher atomic number inert gas; (L) ligands are $R_3Q$, $R_3QO$, $R_2Q$—$QR_2$, $R_2NR^1$, O, S, CO, $R_2N$—$R^2$—$NR_2$, R-S-R, $R^3S$, $[\pi$—$(CHR^4$—$CR^4$—$CH_2$—$)]$, $R^5(CN)_k$, $R^5O$—, $R^5(COO$—$)_k$, $RCOR^6(COO$—$)_k$, $[(RCO)_2CH$—$]$, $(R_2NCSS$—$)$, unsubstituted and $R^5$ group-substituted pyridine, unsubstituted and $R^5$ group-substituted bipyridine, or unsubstituted and R group-substituted cyclopentadienyl radicals; (L') ligands are NO or $[\pi$—$(CHR^4$—$CR^4$—$CH_2$—$)]$ such that at least one L' is NO; wherein R is an aromatic or saturated aliphatic radical, including halo and alkoxy substituted derivatives thereof, having up to 20 carbon atoms; $R^1$ is hydrogen or an R radical; $R^2$ is a divalent R radical; $R^3$ is a divalent saturated aliphatic or ethylenically unsaturated aliphatic radical having from 4 to 10 carbon atoms; $R^4$ is hydrogen or methyl radical; $R^5$ is an aromatic, saturated aliphatic, or ethylenically unsaturated aliphatic radical having up to 30 carbon atoms; $R^6$ is a divalent saturated aliphatic radical having from 1 to 10 carbon atoms; Q is phosphorus, arsenic, or antimony; and $k$ is 1 to 2; and b. an adjuvant represented by the formula
1. $R_e AlX_f$;
2. a mixture of the compounds of (1);
3. a mixture of one or more of $AlX_3$ or $R_e AlX$ compounds with one or more compounds having the formula $R_g^1 M^1 X_h$;
4. an $R_g M^1 Y_h$ compound;
5. an $AlX_3$ compound; or
6. $M^2 M^1 H_j$ compound wherein each R is an aromatic or saturated aliphatic hydrocarbon radical having up to 20 carbon atoms including alkoxy and halo derivatives thereof, preferably an alkyl radical having up to 10 carbon atoms; each $R^1$ is hydrogen or R; each X is a halogen; Y is halogen or hydrogen; each $M^1$ and $M^2$ is a metal of Group IA, IIA, IIB or IIIA; $e$ is 1, 2 or 3; $f$ is 0, 1 or 2, the sum of $e$ and $f$ being 3; $g$ is 1, 2 or 3, $h$ is 0, 1 or 2, the sum of $g$ and $h$ being equal to the valence of $M^1$, $j$ is an integer such that $b$ is equal to the sum of the valences of $M^1$ and $M^2$ and wherein the ratio of said (b) adjuvant to said (a) transition metal compound is effective to decrease the molecular weight of said polymer.

* * * * *

UNITED STATES PATENT AND TRADEMARK OFFICE
CERTIFICATE OF CORRECTION

PATENT NO. : 3,995,095
DATED : November 30, 1976
INVENTOR(S) : James N. Short

It is certified that error appears in the above-identified patent and that said Letters Patent are hereby corrected as shown below:

Column 14, claim 1, line 65, delete "$(CHR^4-CR^4-CH_2-)]$" and substitute therefore --- $(\underline{CHR}^4\underline{-CR}^4\underline{-CH}_2-)]$ ---;

Column 15, claim 2, line 26, delete "nitrosylligand" and substitute therefore --- nitrosyl-ligand ---;

Column 15, claim 2, line 57, delete "$[\pi-(CHR^4-CR^4-CH-$" and substitute therefore --- $[\pi(\underline{CHR}^4\underline{-CR}^4\underline{-CH-}$ ---;

Column 15, claim 2, line 58, after "$_2-)],R^5(CN)_k,$" and before "$R^5$" insert --- $R^5O-$ ---;

Column 16, claim 2, line 7, delete "$[\pi-(CHR^4-CR^4-CH_2-)]$" and substitute therefore --- $[\pi-(\underline{CHR}^4\underline{-CR}^4\underline{-CH}_2-)]$ ---;

Column 17, claim 11, line 9, delete "$MoEl_2,$" and substitute therefore --- $MoCl_2,$ ---;

Column 17, claim 13, line 62, delete "$[(L)_9(1'_bM_cZ_d]_x$" and substitute therefore --- $[(L)_a(L')_bM_cZ_d]_x$ ---;

Column 17, claim 13, line 67, delete "2-] such that at" and insert --- of ---;

UNITED STATES PATENT AND TRADEMARK OFFICE
CERTIFICATE OF CORRECTION

PATENT NO. : 3,995,095
DATED : November 30, 1976
INVENTOR(S) : James N. Short

It is certified that error appears in the above-identified patent and that said Letters Patent are hereby corrected as shown below:

Column 18, claim 13, line 7, delete "[$\pi$-(CH-" and substitute therefore --- [$\pi$-($\underline{C}$H- ---;

Column 18, claim 13, line 8, delete "$R^4$-$CR^4$-$CH_2$')]" and substitute therefore --- $\underline{R}^4\underline{-C}R^4\underline{-}CH_2)$] ---;

Column 18, claim 13, line 9, delete "[(L)$_a$(L')$_b$M$_c$Z]$_x$" and insert therefore --- [(L)$_a$(L')$_b$M$_c$Z$_d$]$_x$ ---;

Column 19, claim 14, line 2, delete "[$\pi$-(CH-" and substitute therefore --- [$\pi$-($\underline{C}$H- ---;

Column 19, claim 14, line 3, delete "$R^4$-$CR^4$-$CH_2$)]," and substitute therefore --- $\underline{R}^4\underline{-C}R^4\underline{-}CH_2)$], ---;

Column 19, claim 14, line 11, delete "QO," and substitute therefore --- 2Q, ---;

Column 19, claim 14, line 22, delete "[$\pi$-($CHR^4$-$CR^4$-$CH_2$-)]" and substitute therefore --- [$\pi$-($\underline{C}\underline{H}\underline{R}^4\underline{-C}R^4\underline{-}CH_2$-)] ---;

Column 20, claim 22, line 57, delete "[$\pi$-($CHR^4$-$CR^4$-$CH_2$]," and substitute therefore --- [$\pi$-($\underline{C}\underline{H}\underline{R}^4\underline{-C}R^4\underline{-}CH_2$], ---;

UNITED STATES PATENT AND TRADEMARK OFFICE
CERTIFICATE OF CORRECTION

PATENT NO. : 3,995,095
DATED : November 30, 1976
INVENTOR(S) : James N. Short

It is certified that error appears in the above-identified patent and that said Letters Patent are hereby corrected as shown below:

Column 20, claim 22, line 58, delete "$R^{R5}O-,$" and substitute therefore --- $R^5O-,$ ---; and delete "$RCOR^6(COO-_k,$" and substitute therefore --- $RCOR^6(COO-)_k,$ ---;

Column 21, claim 23, line 30, delete "21" and substitute therefore --- 22 ---;

Column 21, claim 24, line 35, delete "21" and substitute therefore --- 22 ---;

Column 21, claim 26, line 48, delete "24" and substitute therefore --- 25 ---;

Column 22, claim 28, line 11, delete "denium" and substitute therefore --- denum ---;

Column 22, claim 29, line 17, delete "29" and substitute therefore --- 28 ---;

Column 22, claim 32, line 61, delete "$[\pi-(CHR^4-CR^4-CH_2-)],$" and substitute therefore --- $[\pi-(\underline{CHR}^4-\underline{CR}^4-\underline{CH}_2-)],$ ---;

Column 22, claim 32, line 67, delete "$[\pi-(CHR^4-CR-$" and substitute therefore --- $[\pi-(\underline{CHR}^4-\underline{CR}-$ ---;

UNITED STATES PATENT AND TRADEMARK OFFICE
CERTIFICATE OF CORRECTION

PATENT NO. : 3,995,095
DATED : November 30, 1976
INVENTOR(S) : James N. Short

It is certified that error appears in the above-identified patent and that said Letters Patent are hereby corrected as shown below:

Column 22, claim 32, line 68, delete "$^{4}$-CH$_2$-)]" and substitute therefore --- $^{4}$-CH$_2$-)] ---; and Column 23, claim 32, line 16, delete "R$_e$AlX" and substitute therefore --- R$_e$AlX$_f$ ---.

Signed and Sealed this

Thirty-first Day of May 1977

[SEAL]

Attest:

RUTH C. MASON
*Attesting Officer*

C. MARSHALL DANN
*Commissioner of Patents and Trademarks*